United States Patent
Fowler

[15] 3,643,263
[45] Feb. 15, 1972

[54] RECIPROCATING SYSTEM FOR RECORDING ASSEMBLY

[72] Inventor: Reginald Henry Fowler, Rochester, N.Y.
[73] Assignee: Xerox Corporation, Stamford, Conn.
[22] Filed: May 20, 1970
[21] Appl. No.: 39,944

[52] U.S. Cl. .................................... 346/139 R, 346/74 ES
[51] Int. Cl. ............................................. G01d 15/24
[58] Field of Search ........... 346/139 R, 74 ES; 178/30, 28; 197/49, 55

[56] References Cited

UNITED STATES PATENTS

| 3,424,291 | 1/1969 | Marion | 197/49 |
| 3,518,699 | 6/1970 | Mitchell | 346/139 X |

Primary Examiner—Joseph W. Hartary
Attorney—James J. Ralabate, John E. Beck and Benjamin B. Sklar

[57] ABSTRACT

Electrographic-recording apparatus including a recording assembly positively driven in a reciprocating manner both in a high-speed mode and an incremental mode.

9 Claims, 3 Drawing Figures

INVENTOR.
REGINALD H. FOWLER
BY John E. Beck
ATTORNEY

RECIPROCATING SYSTEM FOR RECORDING ASSEMBLY

This invention relates generally to reciprocating multielement or styli recorders or printers, and specifically to recorders using a linear styli array for recording information on a recording medium in a condition which is visible or easily rendered visible.

One type of prior art recorders employs moving styli in a reciprocating manner.

In such a reciprocating system, the styli or recording head or assembly is moved through a recording zone in a first direction for recording and then in the reverse direction in preparation for the next recording cycle.

The reciprocating motion is generally accomplished by driving a pulley to which is coupled a drive cable attached to the recording head. As the pulley turns to move the head through the recording zone, a spring is either wound up or down. When the pulley moves the head its maximum distance, the pulley's shaft is disengaged to allow the spring to return the head to the left margin, for example, of the recording zone. Such a system relies heavily on the spring which cannot act consistently to maintain uniform movement of the recording head. In addition, the mechanisms responsible for the head's movement are noisy.

Frequently, such a recorder is called upon to operate in an incremental mode, i.e., the stylus array is stepped accurately through the recording zone one character space at a time. Incremental backspacing is also desirable. Again, prior art systems respond inconsistently to these requirements in terms of speed and pollute the environment with excessive noise.

Accordingly, it is an object of the present invention to improve recording apparatus having reciprocating drive systems.

It is also an object of the present invention to provide a novel drive system for a multistyli recorder wherein the recording head is constantly under positive control.

Another object of the present invention is to improve recorders where the recording head is moved positively and accurately in either of two modes: continuous or incremental.

For a better understanding of the invention as well as further objects and features thereof, reference will now be made to the following description to be read in conjunction with the appended drawings wherein.

Figure 1:
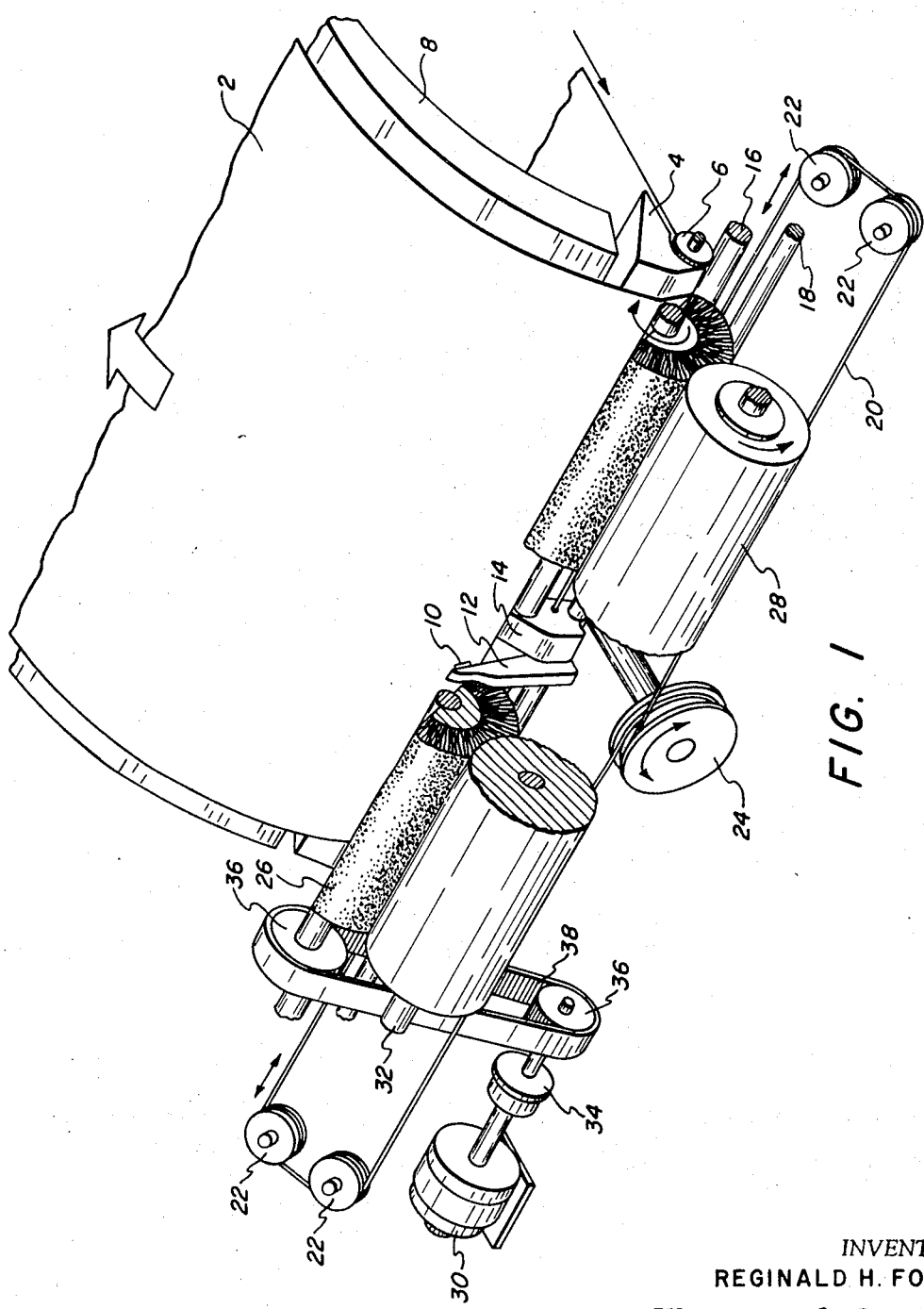
FIG. 1 is a perspective view of the recording portion of the present invention with some parts broken away.

FIG. 1 illustrates the recording portion in which the present invention may be employed. As depicted, this recorder utilizes the process of electrography for recording information on a recording medium which can be rendered visible. The present invention, however, is not limited to an electrographic recorder and may be equally well adapted for electrolytic or electrosensitive recording apparatus.

A recording medium 2, which, in the case of electrography, may comprise an insulating web or a plastic coated paper web, is moved in the direction of the arrow through an elongated recording zone defined by a conductive platen or backing electrode 4 by appropriate pinch rollers which are illustrated. A guide roller 6 is shown which assists in the feeding of the recording medium. The paper may advance through the recording zone in an incremental fashion and will be made to pass over a fuser platen 8 which may be in the form of a resistance element. The function of this fuser platen 8 will be seen in more detail hereinafter.

A recording assembly made up of a linear array of conductive styli or pin electrodes 10 mounted on a support arm 12 which, in turn, is attached to a support member 14 is used to deposit latent electrostatic charge patterns on the recording medium 2 in the conventional electrographic manner. The styli 10 are selectively pulsed by suitable electronics to be described hereinafter as the recording assembly moves through the recording zone. As each stylus is so pulsed a corresponding electrostatic charge pattern is placed on the recording medium 2 in the configuration of the styli's recording face. Usually the number of styli will be seen or nine such that during the movement through one character space a five by seven or seven by nine matrix of charge patterns is possible. In this manner, alphanumeric characters may be recorded as an array of dots or points of electrostatic charge.

The styli themselves may contact the recording medium 2 during the recording process or may be slightly spaced therefrom. The spacing of the styli from the recording medium 2 or, in the case of contact, the amount of pressure applied by the styli on the recording medium 2 is governed in part by the position relative to the backing electrode 4 of two guide rails 16 and 18. These guide rails are shown to pass through support member 14 so that this member may slide on these guiderails.

Attached to either side of support member 14 are the ends of a drive cable 20 which is entrained about idler pulleys 22 and drive pulley 24. As shown, the drive cable 20 is looped completely around the drive pulley 24 in a conventional manner. When the drive pulley 24 is rotated in one direction or the other as indicated by the arrow, the recording assembly will move in either of two predetermined directions through the recording zone.

The drive system for the pulley 24 will be described in more detail in the description of FIG. 2 hereinafter.

Since the recording styli 10 deposit latent electrostatic charge patterns onto the recording medium 2, it is necessary that these patterns be rendered visible. This may be accomplished in several different ways, one of which is depicted in FIG. 1 wherein a fibrous applicator 26 is employed. This applicator may be a natural fur brushlike member or may be made up of a synthetic material as is well known and conventional in the art of brush development. This applicator 26 serves to bring electroscopic marking particles, commonly referred to as toner, into transfer relationship with the latent charge patterns placed on recording web 2 by the styli 10. The charge patterns will attract the marking particles into conformance therewith. This developed image is then rendered permanent by the action of the fuser platen 8 which melts the toner into a permanent bond with the recording medium 2 as it passes thereacross.

Toner may be supplied to the applicator by way of a donor roller 28 which rotates to replenish toner taken from the applicator during the development process. The drive system for the donor roller is not illustrated in FIG. 1 but it may be readily provided by a conventional reducing gear arrangement between the motor 30 and the donor roller's shaft 32. Motor 30, by way of a suitable coupling 34, provides motive power to the applicator by way of pulleys 36 and belt 38 in a conventional manner.

Figure 2:
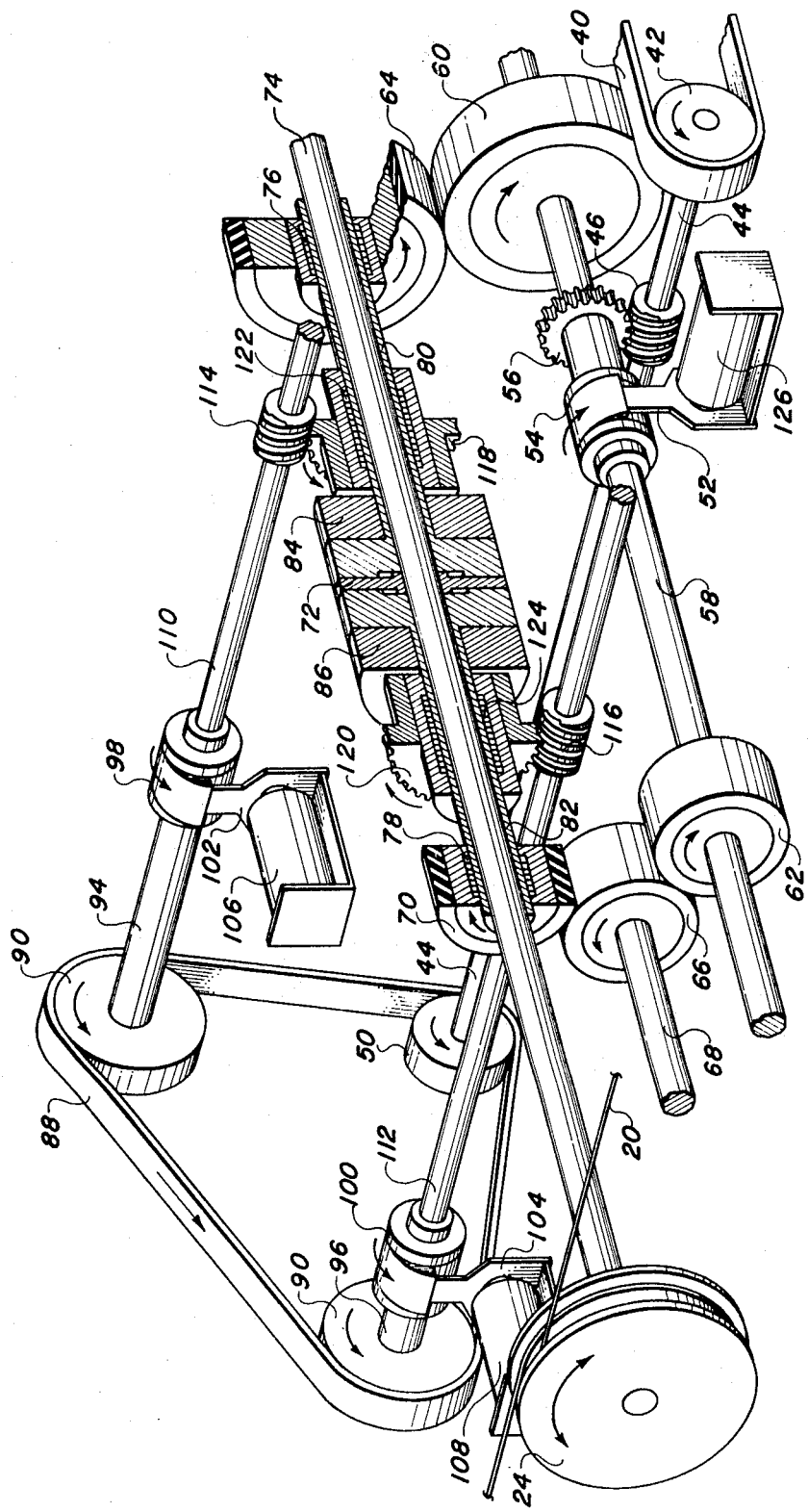
FIG. 2 is a perspective view of the mechanical drive and control for the apparatus of FIG. 1 in accordance with the present invention.

Reference will now be made to FIG. 2 which illustrates the mechanical drive system for the cable pulley 24 which controls via the drive cable 20 the speed and position of the recording assembly in the recording zone. Certain parts of FIG. 2 are shown in section for simplification and explanation.

As explained hereinabove, the present invention has the advantage of being able to positively move the recording head through the recording zone in the direction of recording either at a single constant speed or incrementally a character space at a time. In addition, positive control of the recording cycle or the retrace period during which time the recording head moves from the right margin of the recording medium to an initial position at the left margin. Furthermore, the system of the present invention is capable of backspacing the recording head or assembly incrementally. During any movement of the recording head, positive driving forces are applied thereto without reliance on stored energy in any type of spring or coil member.

In order to explain the operation of the present invention as it concerns the mechanical structure of FIG. 2, it may be best to first describe the high-speed mode of operation of the present invention. In this mode it will be understood that the recording head or assembly is moved at a uniform speed from the left margin to the right margin of the recording medium defining in conjunction with the backing electrode 4 the recording zone. At the end of the recording cycle or traversal, the recording assembly is returned to its initial position at the left margin in preparation for the recording of another line of information onto the recording medium 2.

The source of ultimate motive power is applied to the structure illustrated in FIG. 2 by way of a drive belt 40 which cooperates frictionally with a pulley or gear member 42 depending on whether or not a timing drive belt is utilized. Fixed to pulley 42 is a shaft 44 which has fixed thereto for rotation with pulley 42 a worm 46 as well as another pulley 50. This shaft 44 represents the main motive force input to the arrangement illustrated in FIG. 2.

It will be assumed that the recoding assembly and the styli 10 are positioned at the left margin of the recording zone in preparation for being driven through the recording zone during a recording cycle. As will be explained in more detail hereinafter in connection with FIG. 3, appropriate circuits and switches may be provided to energize and deenergize the particular clutches and interposers to be described in connection with FIG. 2.

In order to drive the recording assembly toward the right margin, it is necessary to withdraw interposer 52 from its position shown in FIG. 2 thereby engaging a conventional spring clutch 54 associated with worm wheel 56. In this condition, worm wheel 56 turns under the influence of worm 46 translating the input motive power from pulley 42 to shaft 58.

Fixed for rotation with shaft 58 are two friction rollers 60 and 62 which cooperate with additional rollers 64 and 66. Roller 66 is an idler roller mounted on a shaft 68 and cooperates with friction roller 70 to rotate this wheel in a direction identical to the direction of rotation of friction roller 62. Without such an interpositioned roller between rollers 60 and 64, roller 64 is driven by roller 60 in a direction opposite to that of roller 60. Therefore, rollers 70 and 64 provide rotative power in opposite directions capable of being coupled to a clutch plate 72 fixed to drive pulley shaft 74. The manner in which this coupling is effected will now be described.

Associated with shaft 74 are a series of clutches, two of which are one-way clutches 76 and 78 associated respectively with friction rollers 64 and 70. These clutches are of conventional design and are adapted to engage clutch sleeves 80 and 82, respectively, when the roller with which they are associated rotates in the direction designated by the arrow on it.

As illustrated, clutch sleeves 80 and 82 have one end associated with electromagnetic clutches 84 and 86, respectively, which, when energized, couple the force translated to either of the sleeves by way of its respective roller and one-way clutch to the clutch plate 72 which is in common with both electromagnetic clutches 84 and 86. Therefore, in the high speed mode the movement of the recording assembly during the recording cycle or transversal is accomplished by energization of electromagnetic clutch 84 which translates the rotative motive power supplied to shaft 44 to the clutch plate 72 and hence to drive pulley shaft 74 via worm 46, worm wheel 56, friction rollers 60 and 64, one-way clutch 76 and clutch sleeve 80. This application of motive force to shaft 74 continues until the recording assembly has reached the end of its recording transversal proximate to the right edge of the recording medium. At this point as will be explained hereinafter, electromagnetic clutch 84 is disengaged simultaneously with the engagement of electromagnetic clutch 86 which now reverses the direction of rotative force applied to pulley 24 by way of friction rollers 62, 66, and 70, clutch sleeve 82, and one-way clutch 78. This initiates the retrace cycle or return traversal of the recording head back to an initial position proximate the left margin of the recording medium.

Depending on the direction in which the recording head is being moved, it can be readily understood that the one-way clutch and its associated friction roller associated with the clutch sleeve coupled to the deenergized electromagnetic clutch rotates about the shaft 74 without any mutual influence.

During the high-speed mode, the drive belt 88 associated with roller 50 on shaft 44 moves through its path in the direction indicated by the arrow. Since this belt 88 is entrained about rollers 90 and 92, the respective shafts of these rollers, 94 and 96 respectively, are also driven into rotation. However, the effect of these shafts is not felt by the mechanical structures associated with drive pulley shaft 74 for the reason that two conventional spring clutches 98 and 100 associated respectively with these shafts are in a disengaged condition due to the action of interposers 102 and 104, respectively. These interposers, as was the case of interposer 52, are controlled by suitable electromagnetic assemblies 106 and 108 which may be selectively energized to retract the interposer thereby permitting the spring clutch to engage itself coupling the rotative power on shafts 94 and 96 to output shafts 110 or 112, respectively. These shafts 110 and 112 have associated therewith worms 114 and 116 respectively. These worms cooperate with worm wheels 118 and 120, respectively, which are associated with respective one-way clutches designated by the reference numeral 122 and 124. The structures referred to in association with belt 88 and pulleys 90 and 92 are provided to control the driving force on the recording head or assembly during the compose mode wherein the styli are moved in a recording direction in an incremental fashion through one character space at a time. Additionally, these mechanical structures also control the incremental backspacing of the recording stylus in the situation where it is desired to correctly record information previously recorded incorrectly. The manner in which the structure contributes to this desired result will now be explained.

In the compose mode, the electromagnetic assembly 126 which controls the position of interposer 52 associated with spring clutch 54 is maintained in a nonenergized condition thereby retaining interposer 52 in abutment with the spring clutch 54 as illustrated in FIG. 2. This effectively maintains the spring clutch 54 in a disengaged condition thereby preventing translation of motive power from worm wheel 56 to friction rollers 60 and 62.

With spring clutch 54 in a disengaged condition, the rotative force applied to pulley 42 by belt 40 is translated only to belt 88 entrained about pulleys 50, 90, and 92. This effectively translates the input rotative power to shafts 94 and 96 which serves as an input to spring clutches 98 and 100, respectively.

In order to move the recording styli through one character space in the compose mode, the interposer 102 controlling spring clutch 98 is withdrawn from engagement with the dog of that clutch upon energization of electromagnetic device or solenoid 106. Spring clutch 98 is then engaged and couples the power translated by shaft 94 to shaft 110 on which is fixed a worm 114 for rotation therewith. Shaft 110 then turns in the direction of pulley 90 and worm 114 cooperates with worm wheel 118 and its associated one-way clutch 122 to engage the clutch sleeve 80.

Simultaneously with the disengagement of interposer 102 with spring clutch 98, electromagnetic clutch 84 is also energized coupling the clutch sleeve to the clutch plate 72. As noted hereinabove, clutch plate 72 is fixed to drive pulley shaft 74 so that, as worm wheel 118 is driven by worm 118, pulley 24 is correspondingly influenced moving the recording assembly in the direction of recording. The extent to which this movement goes is dictated by the number of rotations that worm 114 is permitted to make along with factors such as the pitch of worm 114 and other well-known mechanical parameters. However, these mechanical parameters may be so chosen that the interposer 102 is simply disengaged from the dog with the spring clutch 98 and repositioned for reengagement therewith after the shaft 110 has made one complete revolution. In this manner, precise movement of the recording assembly is possible under positive control. Of course, if it is desirable such as in a tabulating step, interposer 102 can be maintained in disengagement with spring clutch 98 for any desired period of time or number of rotations of shaft 110.

In a manner very similar to the recording increment in the compose mode, backspacing of the recording assembly is accomplished by disengaging interposer 104 associated with spring clutch 100. This is done by energizing solenoid 108 permitting the spring clutch 100 to couple shaft 96 to shaft 112 on which is mounted worm 116. This worm 116 acts to turn worm wheel 120 which cooperates with a one-way clutch 124 to engage clutch sleeve 82. As was the case in the incremental movement of the recording stylus in the direction of recording, electromagnetic clutch 86 is engaged simultaneously with the energization of solenoid 108. Therefore, the pulley 24 is moved incrementally in a direction so that drive cable 20 pulls the recording assembly toward the left margin by predetermined amounts. Again, the amount of movement of the recording assembly toward the left margin is dictated in the first instance by how many revolutions shaft 112 is permitted to make. For simplicity the mechanical parameters of worm 116, worm wheel 120, and pulley 24 are chosen so that interposer 104 may be controlled to permit shaft 112 to make a complete revolution to backspace the recording styli one character space. Therefore, the mechanical parameters of the various mechanical components associated with the stylus movement control in the recording direction and in the retrace direction may be identical. For example, the pitch of worms 116 and 114 are equal as well as the diameters of pulleys 90 and 92 and worm wheels 120 and 118 which also will have an equal number of teeth.

Having described the mechanical control and drive system for the recording apparatus of FIG. 1, reference will now be made to FIG. 3 which illustrates the basic requirements for the electrical control of the drive mechanism itself illustrated in FIG. 2.

The operation of the drive system in either mode, i.e., compose or high speed, commences with the activation of a key on keyboard 130 connecting a source of power to the main drive motor 132 via coupling 134. It is assumed that the recording assembly is positioned at the left margin (LM) before any information to be recorded is received or generated by keyboard 130.

Figure 3:
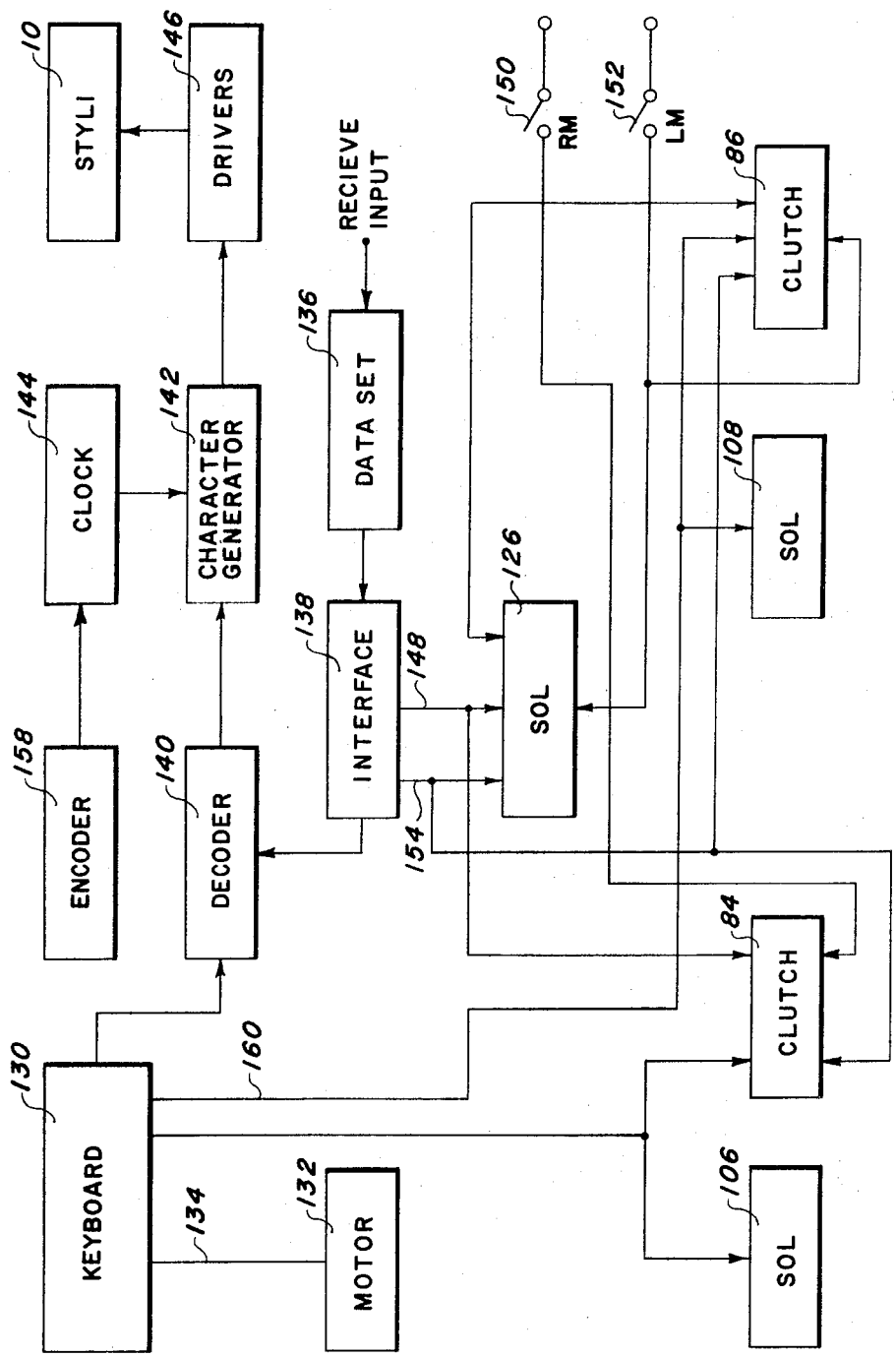
FIG. 3 is a block schematic for controlling the drive system of FIG. 2.

The first mode to be described in connection with the circuit of FIG. 3 is the high-speed or receive mode. In this mode, binary encoded data is provided from a data source such as a computer or other remote apparatus to a terminal interface, such as a standard data set 136. The term "remote" as used herein is intended to include all apparatus generating information to be rapidly printed other than that generated by the keyboard 130. The data set 136 may be a commercially available item commonly employed as a terminal interface in the transmission of binary encoded data. Basically, the data set serves as a buffer amplifier, and accomplishes isolation, power amplification, and impedance matching. Such instrument may be obtained commercially from the Bell System under the designation "Model 201A Data Set."

The data set interface section 138 comprises principally of input-output registers and an input router. This input router is responsive to preselected codes for routing these particular codes to other portions of the circuit of FIG. 3 rather than the decoder 140. In addition, the interface also include conventional timing circuits, including a stable oscillator, electronic counters and associated logic. These elements are not explicitly indicated in view of the fact that the use of such clocking techniques for the data in and out of the registers is a common technique well understood by those skilled in the art of binary data manipulation.

The input data to data set 136 may be considered, for example, as being made up of successive 10 bit words although not limited thereto. Thus, in some typical instances, seven bits will represent a character, one bit will be for parity purposes, as well known, and two bits will be surplusage. In an illustrative case the data is preceded by a routing word. This first word or code which is decoded by the input router in interface 138 indicates by its code whether the data that follows it should be routed to the decoder 140 or to the other parts of the circuit of FIG. 3 as indicated. If routed to decoder 140, then the following information is decoded and transmitted to a character generator 142 which, when gated by a distributing system in conjunction with clock 144, transmits pulses to styli driving circuits 146 which drive appropriate styli in the array to produce latent electrostatic alphanumeric configured charged patterns on the recording medium 2.

When information is received at the data set 136, it may be preceded by a code word or routing word "Commence Message." In this case, the data set interface 138 will decode this routing word which indicates that a pulse indicative of the beginning of a message being received is to be transmitted via conductor 148. In addition, this routing word also tells the data set interface to route that data which follows it to the decoder 140. The effect of the pulse on output 148 indicative of the commencement of a message being received from a remote source is twofold. Solenoid 126 indicated by the block in FIG. 3 with the corresponding number is energized as well as electromagnetic clutch 84. As indicated in the description of FIG. 2, hereinabove, the combination of energizing solenoid 126 and electromagnetic clutch 84 during the application of motive power to shaft 44 via roller 42 and belt 40 is to drive the recording assembly from the left margin toward the right margin at recording speeds. This is what happens as described above when the "Commence Message" word is received by the data set interface 138. As the stylus moves through the recording zone towards the right margin, the data following that word in the data stream is decoded and applied to the character generator 142 and ultimately recorded in the form of matrix characters on the recording medium 2.

The received data may be formated by the data source to present enough information to occupy a full line on recording medium 2, for example, a maximum of 80 characters. After this space of 80 characters a time lapse may be incorporated into the data stream equal to the time required for the recording assembly to be retraced back to the left margin. As shown in FIG. 3, when the recording assembly reaches the right margin (RM), a microswitch 150 suitably positioned relative to the path of the recording assembly may be actuated.

Actuation of microswitch 150 accomplishes three functions simultaneously. An energizing pulse is provided to the solenoid 126 which is already in an energized condition as well as an energizing pulse to electromagnetic clutch 86. In addition to this, a deenergizing pulse is applied to electromagnetic clutch 84 thereby disengaging this clutch. The effect of energizing solenoid 126 and clutch 86 is to now change the direction of motive power supplied to pulley 24 and drive the recording assembly from the extreme right margin back to the left margin where it initially began.

While not providing a part of the present invention, it is helpful to note that the same pulse which is used to reverse the movement of the recording assembly may also be used to increment the recording medium in the recording zone.

As the recording stylus or assembly reaches the left margin, a microswitch 152 is actuated to disengage solenoid 126 and electromagnetic clutch 86. However, in the case of solenoid 126, the data set interface maintains the solenoid in an energized condition and overrides the signal from microswitch 152. Electromagnetic clutch 84 which was previously disengaged by the action of microswitch 150 recovers from this state of deactivation by the reapplication to it of a "Commence Message" signal which may precede every line of data received by data set 136. This repeats the cycle previously described.

At the end of the data stream being received an "End of Message" signal is decoded by data set interface 138 and a representative pulse is generated on output 154 which serves to disengage electromagnetic clutch 84 and to actuate electromagnetic clutch 86. In this case, if the recording stylus is between the two margins it will be returned to the left margin accordingly. Once at the left margin with the "Commence Message" signal down and switch 152 actuated the recording assembly will stay at the left margin.

In the compose mode, the source of data to be recorded is, of course, the keyboard 132. This may be any conventional keyboard for converting an actuated character key into a binary code, as is well known to those skilled in the art of generating digital data. The binary output from the keyboard is routed to decoder 140 which provides a single output pulse for each character to be recorded. This output pulse is supplied to the character generator 142 which then conditions the circuit driving the styli a previously described.

Character generator 142 may be a matrix of switching elements, such as flip-flops or magnetic cores, which operate to distribute the decoder output pulse to a particular group of switching elements which energize the styli to record the desired alphanumeric characters assembled on recording medium 2. The details of the decoder 140, character generator 142, and the driver circuits 146 have not been set forth in detail because they are well known to those skilled in the art.

As an alphanumeric key is actuated at the keyboard 130, an output signal is generated on output 156. The effect of this signal is to temporarily energize solenoid 106 simultaneously with the energization of electromagnetic clutch 84. As noted before, the action of this combination is to permit shaft 110 to make a complete revolution moving the recording stylus through one character space on the recording medium.

It may be desirable to ensure the adequate spacing of the charged areas of the matrix being used during this incremental move. This is accomplished through the use of an optical encoder 158 or shaft encoder which may be suitably coupled to shaft 110. It may be of conventional design so as to generate a train of pulses equal in number to the number of columns being used in the particular matrix system employed. The purpose of this pulse train is to synchronize character generator 142 by way of clock 144 to generate character information at the proper time thereby compensating for any variation in the velocity of the recording assembly as it moves from one column position to another within a character space. The encoder 158 may be constructed in any known manner. It may include, for example, a wheel having seven, in a case of a 5×7 matrix, inserts of magnetic susceptible material on its peripheral surface and a magnetic induction sensor for generating the aforementioned pulse train for each revolution of the encoder wheel.

If it is desirable to backspace the recording assembly in the recording zone, the appropriate key may be depressed on the keyboard 130 energizing output line 160 which temporarily energizes solenoid 108 and electromagnetic clutch 86. As described hereinabove in connection with FIG. 2, this permits shaft 112 to make a complete revolution moving the recording assembly toward the left margin by exactly one character space. Therefore, each time the backspace key is depressed, such a movement will result. It may be desirable, since the information is being recorded as it is inputed via keyboard 130, to associate a paper increment function with the pulse generated output 160 which would be within the skill of one in the art.

As the compose mode progresses, the right margin will eventually be reached at which time the microswitch 150 will be closed energizing solenoid 126 simultaneously with electromagnetic clutch 86. This functions to very quickly move the recording assembly back to an initial position at the left margin ready to record more information in the compose mode or in the high-speed or receive mode.

It will be readily apparent that it is necessary in certain situations to retract the recording styli from contact with the recording medium during the retrace cycle. This may be accomplished by using the appropriate signals described above in connection with FIG. 3 to pivot guide shaft 16 above shaft 18 thereby slightly removing the styli array 10 from the surface of the recording medium.

What is claimed is:
1. Recording apparatus comprising:
a recording assembly;
guide means supporting said recording assembly for reciprocating movement in a recording zone adjacent a recording medium;
means including a rotatable member for effecting reciprocating movement of said recording assembly in said recording zone;
means supported by said rotatable member for effecting rotation thereof in two directions, said rotation effecting means comprising, a clutch plate fixed to said rotatable member and a pair of electromagnetic clutches, each including an elongated sleeve portion, a pair of friction wheels and one-way clutches for coupling said wheels to said sleeve portions; and
means including a source of motive power for rendering said rotation effecting means continuously operable.

2. Recording apparatus according to claim 1 further including:
means operably coupled to said source of motive power and said sleeve portions for rendering said rotation effecting means selectively operable, incrementally.

3. Apparatus according to claim 2 wherein said recording assembly comprises an array of electrographic recording styli, and
further including a backing electrode adapted to support a recording medium in said recording zone.

4. Apparatus according to claim 2 wherein said means for rendering said rotation effecting means incrementally operable comprises worm and worm-wheel pairs and one-way clutches for coupling said worm wheels to said sleeve portions.

5. Apparatus according to claim 4 including means for rendering inoperable the one-way clutches associated with said worm wheels during continuous rotation of said rotatable member and spring clutch 54 for rendering inoperable said one-way clutches associated with said friction wheels during incremental rotation of said rotatable member.

6. Apparatus according to claim 2 including first and second pulse generating sources response to pulses from only one of said sources.

7. Recording apparatus comprising:
a. a backing electrode adapted to support a recording medium in a recording zone,
b. a recording assembly including at least one recording element;
c. guide means for supporting said recording assembly in said recording zone including a guide shaft on which said recording assembly is movably mounted;
d. mechanical coupling means coupled to said recording assembly and responsive to motive forces to move said recording assembly in a reciprocating manner through said recording zone;
e. a source of motive power;
f. a first shaft coupled to said source of motive power;
g. a second shaft coupled to said mechanical coupling means;
h. first and second clutch means adapted when energized to translate input motive power to a common clutch plate fixed to said second shaft,
i. first drive means mechanically coupled to said first shaft and said first clutch means for applying as an input to said first clutch means motive power to rotate said clutch plate in a first direction upon the energization of said first clutch means;
j. second drive means mechanically coupled to said first shaft and said second clutch means for applying as an input to said second clutch means motive power to rotate said clutch plate in a second direction opposite to said first direction upon the energization of said first clutch means;
k. means for selectively energizing said first and second clutch means for a period of time sufficient to permit said recording assembly to reciprocate through said recording zone;

l. means for supplying information signals to said recording element representative of information to be recorded during the energization of said first clutch means.

8. Recording apparatus as defined in claim 7 further including:
   a. first increment means coupled to said first shaft for coupling motive power to the input of said first clutch means to rotate said clutch plate in a said first predetermined amount less than the full width of said recording zone when said first clutch means is energized;
   b. second increment means coupled to said first shaft for coupling motive power to the input of said second clutch means to rotate said clutch plate in said second direction said predetermined amount when said second clutch means is energized; and
   c. means for selectively energizing said first and second increment means.

9. An electrographic-recording apparatus wherein electrostatic charge patterns are deposited on a recording medium in alphanumeric configuration in character spaces comprising:
   a. a plurality of recording styli and a support member therefor;
   b. a backing electrode adapted to support a recording medium in a recording zone;
   c. a drive pulley;
   d. a drive cable looped about said drive pulley and having two ends coupled to said support member;
   e. a drive shaft fixed to the axis of said drive pulley;
   f. a clutch plate fixed about said drive shaft;
   g. first and second electromagnetic clutches on either side of said clutch plate and first and second clutch sleeves associated respectively with said clutches, said clutch sleeves being concentric with said drive shaft;
   h. a first worm wheel having a one-way clutch which engages said first clutch sleeve when said first worm wheel is moved in a first direction;
   i. a second worm wheel having a one-way clutch which engages said second clutch sleeve when said record worm wheel is moved in a second direction opposite to said first direction;
   j. a first friction roller having a one-way clutch which engages said first clutch sleeve when said first friction roller is moved in said first direction;
   k. a second friction roller having a one-way clutch which engages said second clutch sleeve when said second friction roller is moved in said second direction;
   l. a source of motive power;
   m. first shaft mechanically coupled to said source;
   n. a first worm mounted on said first shaft;
   o. a second shaft;
   p. third and fourth friction rollers mounted on said second shaft, said third friction roller engaging said first friction roller;
   q. a fifth friction roller mounted to mutually engage said second and fourth rollers;
   r. a second worm wheel mounted on said second shaft to engage said second shaft upon the activation of a spring clutch also mounted on said second shaft, said worm wheel being in cooperative relation with said first worm;
   s. three pulleys and an endless belt entrained thereon, one of said pulleys fixed to rotate with said first shaft, the other two pulleys fixed respectively to third and fourth shafts;
   t. a first and second spring clutch having respective inputs from said third and fourth shafts, fifth and sixth shafts forming the respective outputs of said first and second spring clutches, said fifth and sixth shafts each having a worm mounted thereon for engagement with said first and second worm wheels, respectively, to drive said first and second worm wheels in said first and second directions, respectively, when said first and second spring clutches are activated, respectively;
   u. keyboard means for generating backspace and forward signals as well as character signals upon the actuation of keys thereon, said backspace signals being coupled to energize said second spring clutch and said second electromagnetic clutch simultaneously, said forward signals being coupled to energize said first spring clutch and said first electromagnetic clutch simultaneously, said character signals being applied to said recording styli;
   v. an input terminal means for translating information signals to said recording styli and control signals to said spring clutch and first electromagnetic clutch during the recording cycle and to said second electromagnetic clutch and said spring clutch during the retrace cycle;
   w. means for disengaging said first electromagnetic clutch when said recording styli reach one margin of said recording zone and engaging said second electromagnetic clutch; and,
   x. means for disengaging said spring clutch and said second electromagnetic clutch when said recording styli reaches the other margin of said recording zone.

* * * * *